June 7, 1927.  
E. P. BULLARD, JR  
TOOL SLIDE MECHANISM  
Filed Feb. 8, 1924  
1,631,579  
4 Sheets-Sheet 3

Inventor  
Edward P. Bullard, Jr  
By Chamberlain + Newman  
Attorneys

Patented June 7, 1927.

1,631,579

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

TOOL-SLIDE MECHANISM.

Application filed February 8, 1924. Serial No. 691,334.

This invention relates to an improved tool slide mechanism for machine tools, and particularly that type of machine tools which include a rotatable carrier, having one or more rotary work tables, and one or more tool slide mechanisms related to the respective work tables, and adapted to move into and out of relation to the work and to operate thereon automatically.

An object of the invention is to provide tool slides adapted to have vertical and horizontal movement imparted thereto from a single source of power, and further to provide for the independent adjustment of the slides relatively to the work, to the end that the machine may be adapted to work upon pieces of different horizontal and vertical dimensions, and of various shapes.

A further object is to provide means whereby the relative extent and speed of the vertical and horizontal slides may be adjusted and regulated, as desired. A still further object is to provide means whereby the slides may be reciprocated in either direction relative to each other, that is, the horizontal slide may be made to either move to the right or the left during the downward movement of the vertical slide, or in either direction during the upward movement.

It is also an object to provide a machine which is practical, efficient, and durable, and which will insure uniform and accurate work.

With the above and other objects in view, an embodiment of the invention is shown in the accompanying drawings, and this embodiment will be hereinafter more fully described with reference thereto, and the invention will be finally pointed out in the claims.

Similar reference characters indicate corresponding parts throughout the several figures of the drawings.

Figure 1:
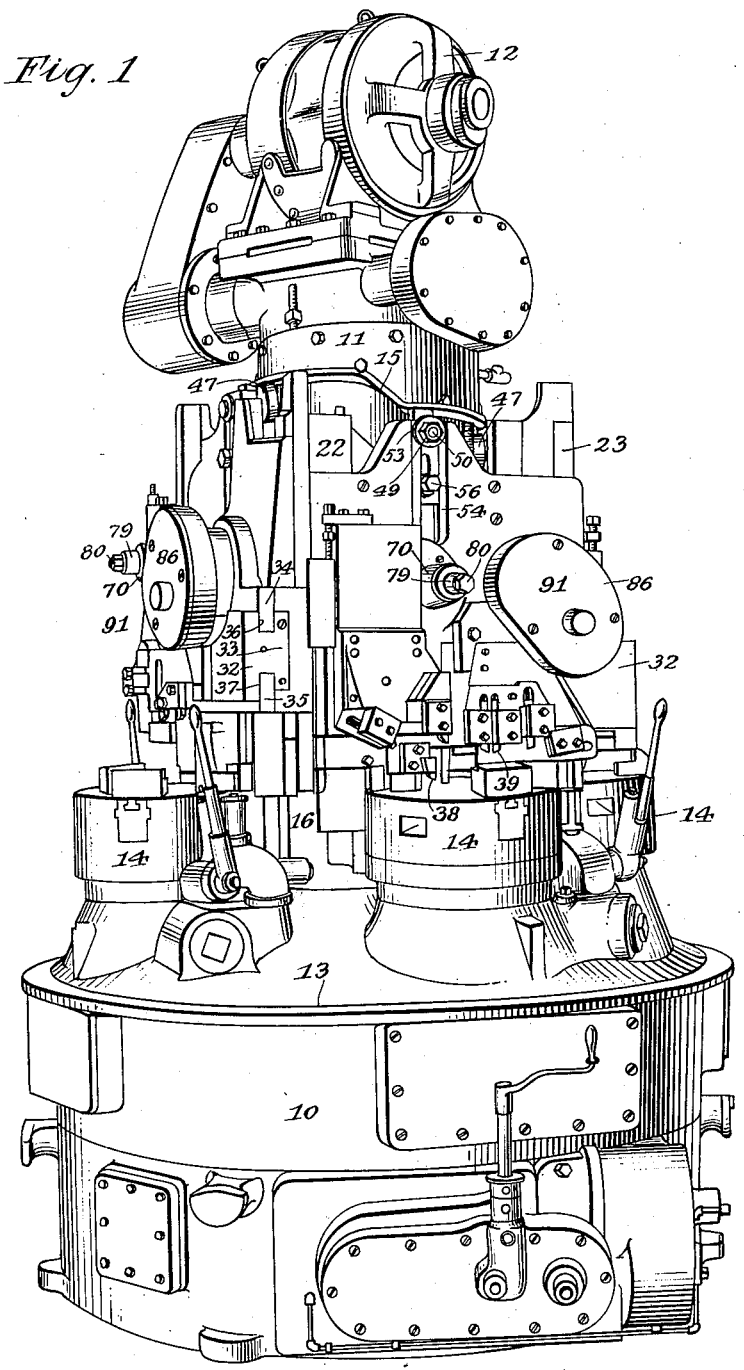
Fig. 1 is a perspective view of a machine of the type known in the trade as a "Contin-U-Matic", in which tool slide mechanism according to the present embodiment of the invention, is incorporated.

Referring particularly to Fig. 1 of the drawings, the machine tool in which the present embodiment of the invention is incorporated comprises a base 10, having a central pedestal 11 upon the upper end of which a work table driving motor 12 is mounted, and a turret type carrier 13 rotatably mounted on the base and pedestal and carrying a plurality (four as shown) of rotary work tables 14, these tables adapted to be rotated through suitable shafts and gearing (not shown) from the motor 12, while the carrier is rotated by suitable motor driven means (not shown) independently of the rotation of the work tables. The carrier may either be rotated continuously or intermittently, the machine illustrated being of the "Contin-U-Matic" or continuously rotating carrier type.

At the upper end of the pedestal and above the carrier a continuous circumferential cam 15 is provided, and is adapted as the carrier rotates to operate the several tool slide mechanisms being mounted on the carrier in relation to the several work tables.

The tool slide mechanisms (four in the present embodiment) are of identical construction, so that only one will be described in detail. Upon the column 16 of the carrier, which surrounds the pedestal 11 there are provided vertical ways 17 and 18 (Fig. 3) in which the vertical slide ribs 19 and 20, bolted to the saddle 21 are engaged and held by gibs 22 and 23 respectively. The saddle is adapted to be reciprocated vertically to a limited extent to bring the tool slides into relation with the work upon the work tables, whereupon the tool slides are independently reciprocated upon the saddle to operate upon the work, as will hereinafter more fully appear.

The saddle is provided at its front face and at one side of the center with a vertical slide way 24 in which the vertically reciprocating tool supporting slide, consisting of a front plate 25 and a rear plate 26 bolted thereto, is held by retaining gibs 27 and 28 screwed into the saddle, and engaged in recesses 29 and 30 at the sides of the front plate 25.

At the other side of the center and also upon the front face of the saddle there is provided a slide way 31 in which the horizontally reciprocating tool supporting slide, comprising a front plate 32 and a rear plate 33, bolted thereto, is held by gibs 34 and 35 screwed to the saddle and engaging recesses 36 and 37 in the upper and lower sides of the plate 32. Tools 38 and 39 are provided upon suitable plates which are attached to the respective tool slides in any suitable arrangement for the particular work being done.

Figure 5:
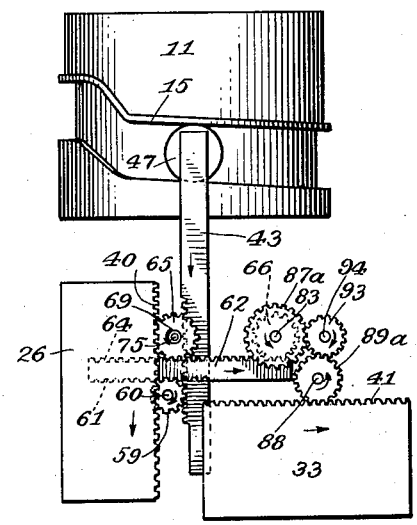
Fig. 5 is a diagrammatic view showing the gear arrangement for the tool slide.
Figure 6:
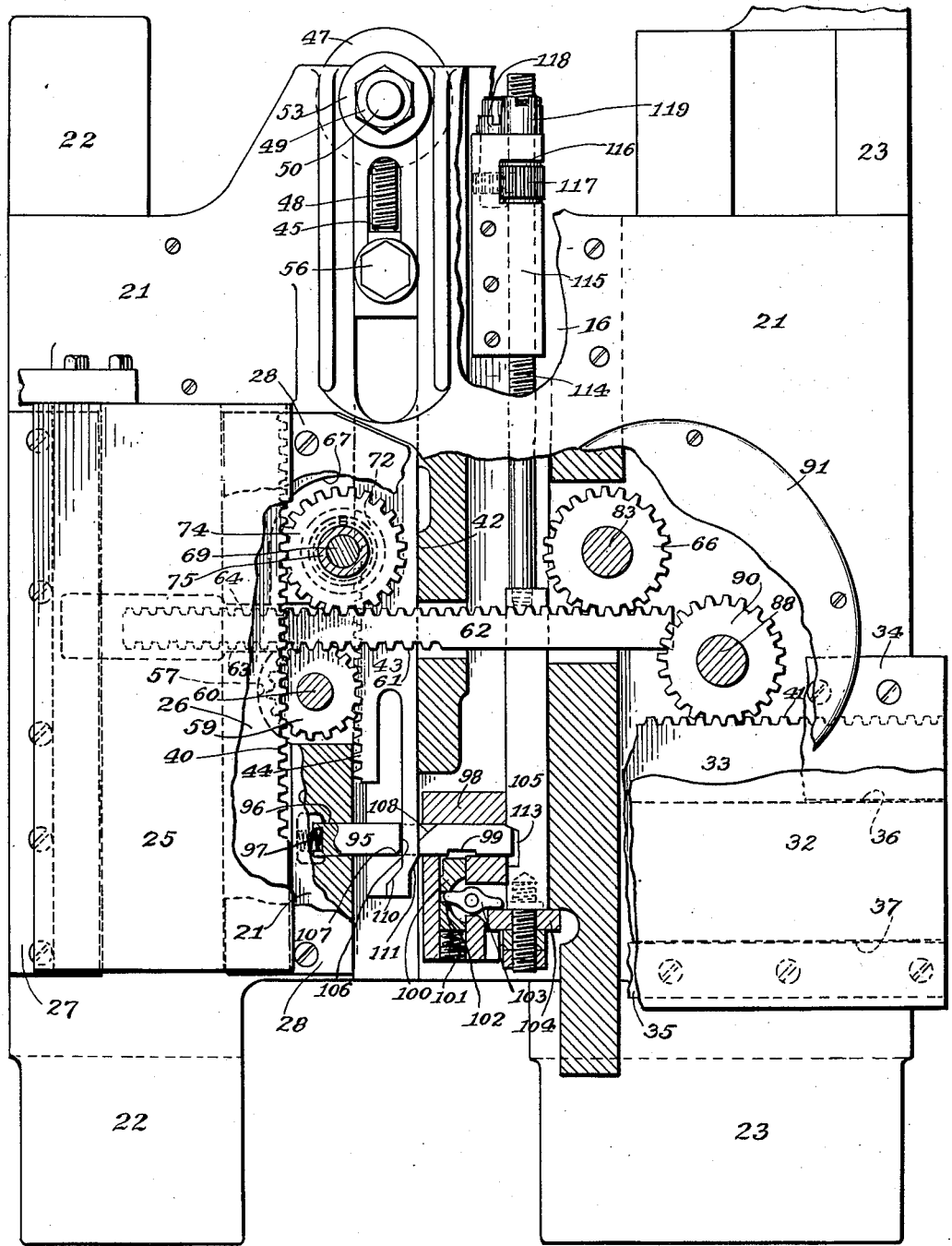
Fig. 6 is a view partly in section and with parts broken away, showing the locking and releasing mechanism employed for reciprocating the tool slide mounting saddle.

As clearly shown in Figs. 5 and 6 the inner vertical edge of the inner plate 26 of the vertical tool slide and the top edge of the inner plate 33 of the horizontal tool slide are provided with rack teeth 40 and 41, respectively, and through intermediate gearing operated through the cam 15 and meshing with the racks, as will presently be more fully described, the tool slides are reciprocated.

The saddle 21 is provided at its rear side and centrally with a vertical slideway 42 in which a vertical slide rod 43 is mounted for vertical reciprocation, this rod being provided at one side with rack teeth 44. At its upper end there is provided a vertical slot 45 in which there is adjustably mounted a stud member 46 provided with a roller 47 engaging the cam groove 15, the stud being adjustable by means of a vertical screw 48 engaging the same within the slot and journaled at the upper end of the rod where it may be turned by a suitable wrench. The stud is fixed in its adjusted position by means of a nut 49 provided on a threaded extension 50 thereof and bearing upon a plate 51 engaged with the slide rod 43 and moving therewith in the slideway 42. A collar 52 and washer 53 are interposed between the nut and plate, the collar moving in a vertical guide passage 54 of the saddle, while the washer slidably engages the forward surface of the saddle at each side of the guide passage. The plate 51 is provided with a vertical slot 55 engaged by a stud bolt 56 screwed into the rod beneath the slot 45 thereof, and having its head disposed in the guide passage 54. The relative position of the roller 47 with respect to the cam and rod may thus be adjusted, as desired.

The saddle is provided at one side of the slide way 42 with a pocket 57 in which are disposed integral gears 58 and 59 having a common shaft or spindle 60 journaled in suitable bearings formed in the saddle, the gear 58 meshing with the rack teeth 44 of the rod 43, while the gear 59 meshes with the lower teeth 61 of a horizontal rack member 62 supported in a slide-way 63, so that vertical reciprocatory movement of the rod 43 imparts horizontal reciprocatory movement to the rack member.

Figure 3:
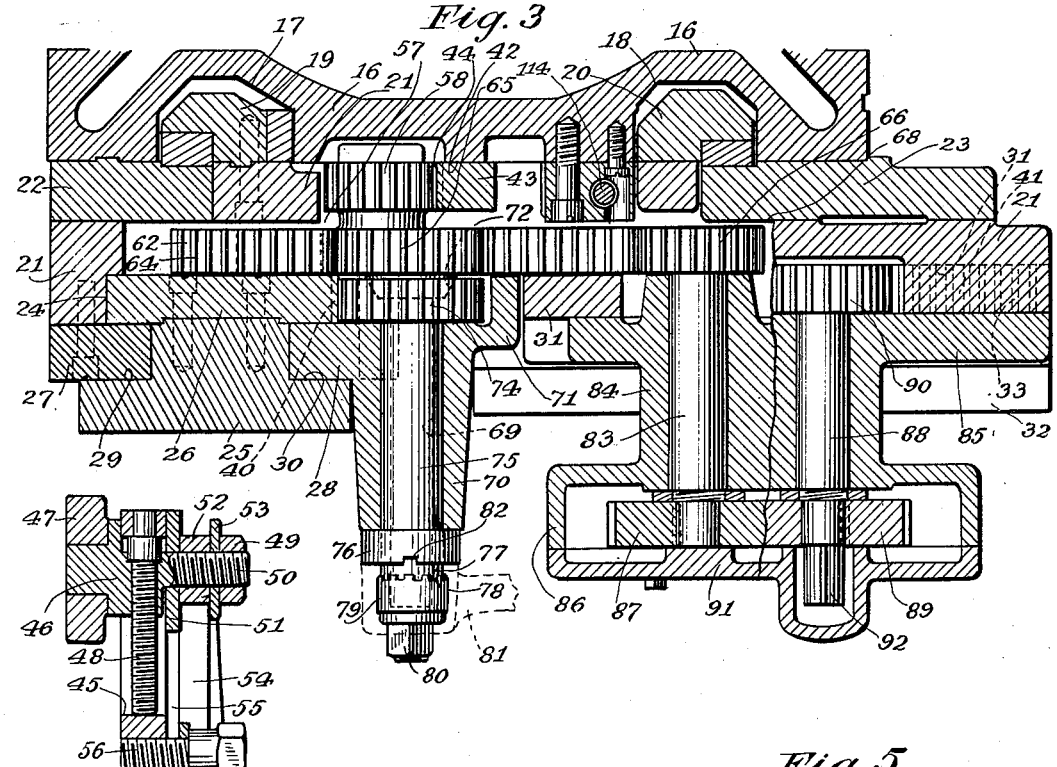
Fig. 3 is a horizontal sectional view taken along the line 3—3 of Fig. 2.
Figure 4:
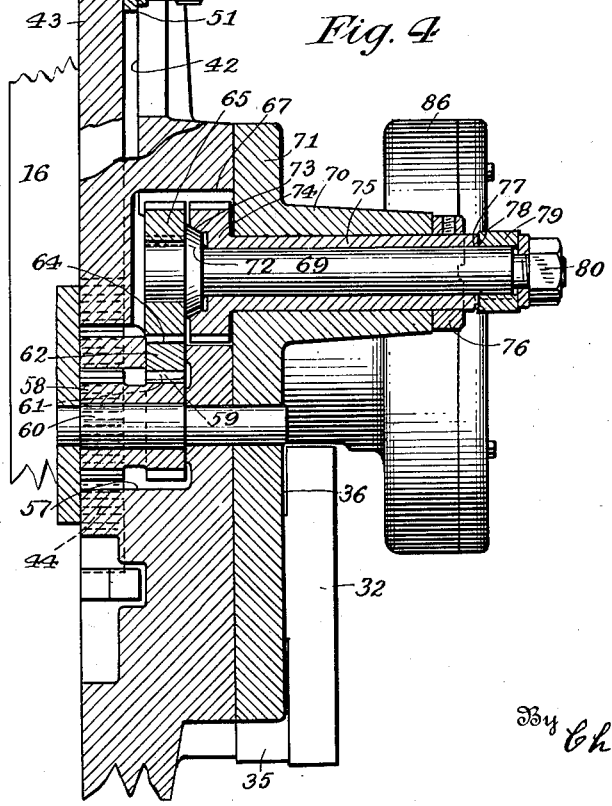
Fig. 4 is a vertical sectional view taken along the line 4—4 of Fig. 2.

The rack member is provided along its upper edge with rack teeth 64 which mesh with and drive gears 65 and 66, Figs. 3 and 4, disposed in suitable pockets 67 and 68 of the saddle, and adapted to respectively drive the vertical and horizontal tool slides. The gear 65 is keyed upon a spindle 69 disposed in a forwardly projecting bearing boss 70 formed upon the cover plate 71 bolted to the saddle and closing the pocket 67, said spindle being provided adjacent the gear 65 with an annular beveled shoulder 72 engaged by an annular beveled recess 73 provided in the face of a gear 74 provided on the spindle and meshing with the rack teeth 40 of the vertical tool slide. The gear 74 is provided with an elongated sleeve 75 surrounding the spindle 69 and having bearing in the boss 70, its forward end projecting beyond the boss and having a retaining collar 76 secured thereon. The end of the sleeve is provided with teeth or serrations 77 which are engaged by the toothed end 78 of a collar 79 slidably keyed upon the end of the spindle and held in engagement with the teeth 77 by means of a nut 80 screwed upon the end of the spindle, to thereby lock the spindle and sleeve and tightly engage the beveled shoulder 72 with the beveled recess 73. In this tightened relation the gears 65 and 74 rotate as a unit and the reciprocatory movement of the bar 43 imparts reciprocatory movement to the vertical tool slide.

Figure 2:
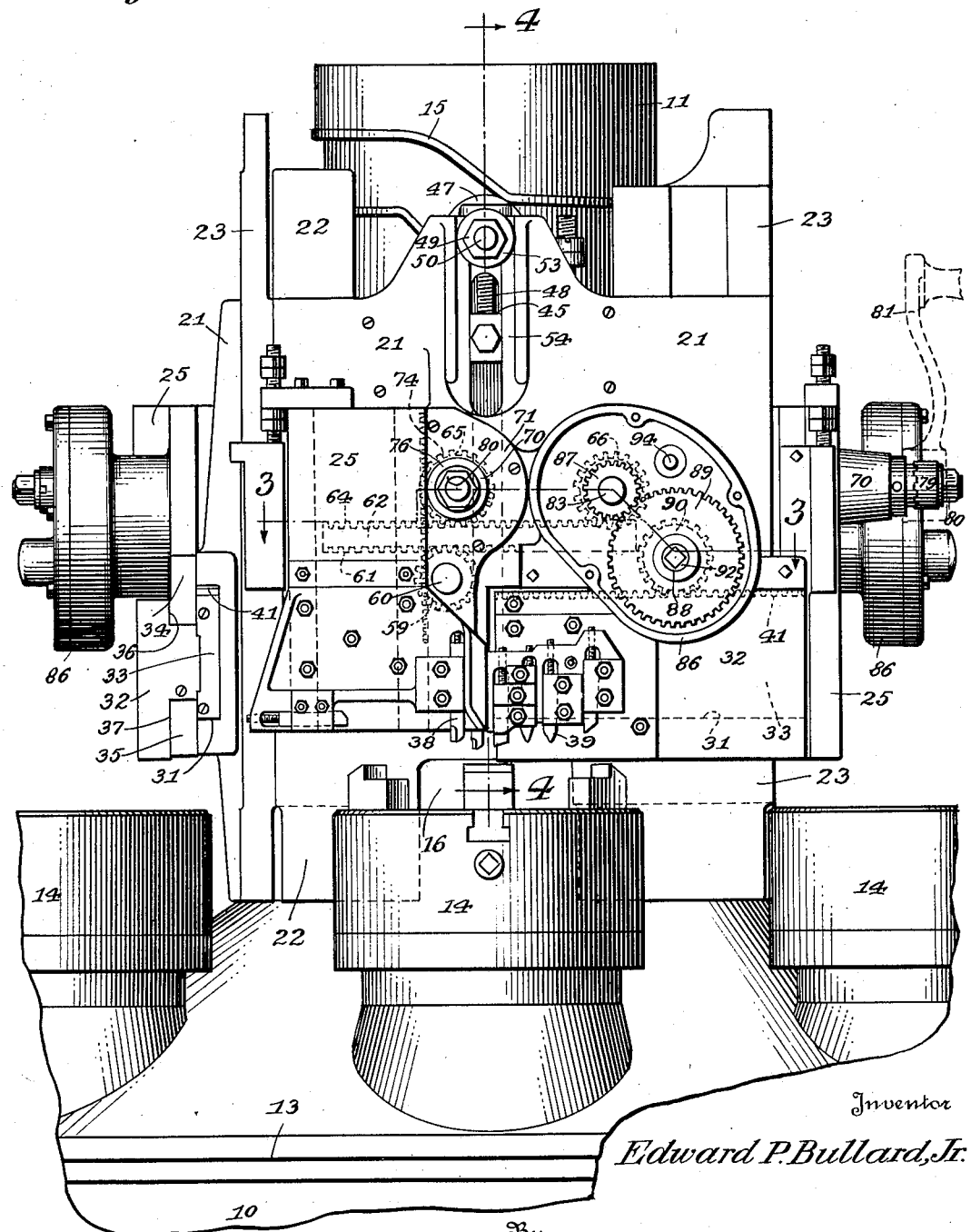
Fig. 2 is a front and side elevation on an enlarged scale of the tool slide mechanisms mounted upon the column and showing the work tables in relation therewith.

In order to turn the gear 74 independently of the gear 65 to permit of independent adjustment of the tool slide, the nut 80 is backed off to disengage the teeth 77 and 78 and loosen the relation between the beveled shoulder 72 and recess 73, and thereupon a crank handle 81, indicated in dotted lines in Fig. 2, is engaged with the collar 76, which is provided with notches 82 for this purpose, with which teeth on the crank handle engage, and by turning the crank in one or the other directions the vertical tool slide is adjusted up or down, as desired, the nut 80 being tightened to fix the relation when the proper adjustment is made.

The gear 66 for driving the horizontal tool slide is mounted on a spindle 83 journaled in the bearing portion 84 of a cover plate 85 bolted to the saddle, said portion 84 having a gear box 86 formed integrally therewith, within which a gear 87 is keyed upon the end of the spindle 83. The bearing portion 84 has also journaled therein a spindle 88 provided at its forward end with a gear 89 meshing with the gear 87, and provided at its inner end with a gear 90 meshing with the rack teeth 41 of the horizontal tool slide.

The gears 87 and 89 are slidably keyed to the spindles 83 and 88, so as to be readily removable therefrom upon removal of the cover plate 91 of the gear box, and permitting substitution of gears of different ratios, for the obvious purpose of changing the relative speed of movement of the tool slide, as desired.

The spindle 88 is provided with a squared extension 92 adapted to be engaged by a suitable crank handle or wrench, upon removal of the gear 87, to permit of the horizontal tool slide being adjusted independently of the vertical tool slide and the drive gearing.

When the gears 87 and 89 are in direct meshing relation with each other, as shown in Fig. 2, the reciprocation of the rack 62 to the right imparts horizontal movement to the slide in the opposite direction. In order to reverse this relation gears 87ª and 89ª are engaged upon the spindles 87 and 88 with the teeth out of mesh, as shown in Fig. 5, and an idler gear 93 is mounted on a stud 94 provided within the gear box between said gears, and meshing therewith, so that the tool slide reciprocates in a reverse direction to that as above referred to, or in the same direction as the rack. In this manner the horizontal slide may be made to reciprocate in either direction, as desired, as the vertical tool slide is reciprocated either up or down.

As before pointed out the initial reciprocatory movement of the rod 43 is also imparted to the saddle to bring the tools into and out of operative relation with the work, and thereupon the saddle remains stationary and the continued reciprocation of the rod imparts movement to the tool slides through the gear mechanism. For this purpose a mechanism is provided which locks the bar 43 to the saddle during the initial reciprocatory movement and releases it at a predetermined point, whereupon it functions to operate the tool slides. A mechanism of this character is disclosed and claimed in my U. S. Patent #1,382,339. As incorporated in the present invention, it comprises in part a locking pin 95 that is engaged by the rack rod 43, and other means for automatically operating the same at predetermined times. This locking pin is mounted in part in a pocket 96 of the saddle 21, and in which is also provided a spring 97 that acts upon the pin to force the same outward. The other end portion of the pin is operatively mounted in a bracket 98 which is secured to the inner face of the saddle said pin being provided with notch 99 in its side portion to be engaged by the detent 100 that is slidably mounted in a vertical pocket of the lower part of the same bracket 98. This detent is yieldably held in engagement with the pin by means of a spring 101 and is provided with a pocket 102 into which one end of a trip lever 103 extends and whereby the detent is disengaged from the locking pin to free the same when the said lever engages the stop 104 on the adustable stop bar 105.

The locking pin is further provided with a vertical hole 106 therethrough having specially shaped side walls which include an incline 107 upon one side and an off-set incline 108 upon the other. These inclines are engaged at certain times by the corresponding inclines 110, 111 provided on the rod 43, so as to more positively control the position and operation of the locking pin. In this connection it will be seen that during the feeding operations the tendency of the rack is to bear upon the pin so long as the latter is locked by the detent. The rack and the tool slide operating gears meshing therewith are therefore held against independent movement and become fixed so as to be locked to the saddle. This condition insures the vertical movement of the saddle and tool slides downward until the free end of the lever 103 engages the stop 104 which action causes the withdrawal of the detent 100 and allows the locking pin to be shoved over by the action of the spring 97 and the rack, into the pocket 113 of the stop bar 105 as shown in Fig. 6. This releasement of the lock pin arrests further combined movement of the slide rod and saddle and now permits the rod to be independently fed downwardly with respect to the saddle in a manner to cause the vertical and horizontal feed of the respective tool slides.

The stop bar 105 is adustably mounted on the column 16 of the work carrier, and is adapted to be raised and lowered to position its pocket 113 at various heights from the work table and so as to stop the downward feed at any desired point and throw in the independent tool slide feed. This stop bar is suspended upon an adustable screw 114 that is slidably mounted in a bearing 115 secured to the face of the column, and provided within a cut-out 116 with an adjusting nut 117 fixed against longitudinal movement. The outer surface of the nut 117 is toothed and is meshed by the toothed end of a rotatable key member 118 journalled in the bearing 115, and adapted to be engaged by a suitable wrench to adjust the stop bar up or down, as desired, a lock nut 119 engaged upon the upper end of the screw 114 adapted to fix it in adjusted position. From this construction it will be understood that the lower the position of the stop bar, the longer will be the down feed, and the shorter the feed of the tool slides, which are thrown in just as soon as the down movement of the stop pin reaches the pocket 113 and releases the rack to operate the pin 95. The return feed movement is just the reverse, the tool slides being fed reversely until the rack 43 becomes locked with the pin 95, which is withdrawn from engagement with the pocket 113 by this action, and thereupon the rack and saddle move upwardly together.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a tool slide mechanism, a support, a pair of tool slides mounted on said support and adapted to have angular movement with respect to each other, a common drive means, gear means between said common drive means and one of said slides, gear means between said first gear means and said other slide, and means for manually connecting and disconnecting said gear means, whereby said slides may be manually reciprocated independently of each other.

2. In a tool slide mechanism, a support, a pair of tool slides mounted on said support and adapted to have angular movement with respect to each other, a reciprocating rack member, gear means between said rack member and one of said slides, gear means between said first gear means and said other slide, and means for manually connecting and disconnecting said gear means, whereby said slides may be manually reciprocated independently of each other.

3. In a tool slide mechanism, a support, a tool slide mounted to reciprocate on said support, and provided with a rack, a reciprocating rack member mounted on said support, a gear adapted to be rotated by said rack member, a gear meshing with said tool slide rack, and means for releasably connecting said gears to permit adjustment of the tool slide independently of the rack member.

4. In a tool slide mechanism, a support, a tool slide mounted to reciprocate on said support and provided with a rack, a reciprocating rack member on said support, a gear adapted to be rotated by said rack member and having a spindle, a gear mounted on said spindle and meshing with said tool slide rack, and means whereby said last gear may be made fast or loose on said spindle.

5. In a tool slide mechanism, a support, a tool slide mounted to reciprocate on said support and provided with a rack, a reciprocating rack member on said support, a gear adapted to be rotated by said rack member and having a spindle, a gear mounted on said spindle and meshing with said tool slide rack, means whereby said last gear may be made fast or loose on said spindle, and manually operable means for rotating said last gear when loose to reciprocate said slide independently of said rack member.

6. In a tool slide mechanism, a support, a tool slide mounted to reciprocate vertically, a second tool slide mounted to reciprocate horizontally, a reciprocating rack member, a pair of gear adapted to be driven thereby, one for each slide, and gearing between said pair of gear and the tool slides adapted to permit adjustment of said slides independently of said first gears and of each other.

7. In a tool slide mechanism, a support, a pair of tool slides mounted to reciprocate thereon, a reciprocating rack member, a pair of gears adapted to be driven thereby, one for each slide, and change gearing between one of said gears and one of the slides permitting the speed ratio to be changed relatively to the other slide.

8. In a tool slide mechanism, a support, a pair of tool slides mounted to reciprocate thereon, a reciprocating rack member, a pair of gears adapted to be driven thereby, one for each slide, and change gearing between one of said gears and one of said slides permitting reversal of the direction of feed of the slide relatively to the other slide.

9. In a tool slide mechanism, a support, a tool slide mounted to reciprocate vertically, a second tool slide mounted to reciprocate horizontally, a vertically reciprocating drive rack, a horizontally reciprocating rack member adapted to be reciprocated by said vertical rack member, and a pair of gears driven by said horizontal rack member adapted to reciprocate said respective tool slides.

10. In a tool slide mechanism, a support, a tool slide mounted to reciprocate vertically, a second tool slide mounted to reciprocate horizontally, a vertically reciprocating drive rack, a horizontally reciprocating rack member adapted to be reciprocated by said vertical rack member, and a pair of gears driven by said horizontal rack member, and disconnectable drive means between said last gears and said slides.

11. In a tool slide mechanism, a support, a tool slide mounted to reciprocate vertically, a second tool slide mounted to reciprocate horizontally, a vertically reciprocating drive rack, a horizontally reciprocating rack member adapted to be reciprocated by said vertical rack member, gearing between said rack member and one of said slides, and change gearing between said rack member and the other slide.

12. In a tool slide mechanism, a support, a tool slide mounted to reciprocate vertically, a second tool slide mounted to reciprocate horizontally, a vertically reciprocating drive rack, a horizontally reciprocating rack member adapted to be reciprocated by said vertical rack member, gearing between said rack member and one of said slides, and disconnectible gearing between said rack member and the other slide permitting independent adjustment of said slide.

13. In a tool slide mechanism, a support, a tool slide mounted to reciprocate vertically, a second tool slide mounted to reciprocate horizontally, a vertically reciprocating drive rack, a horizontally reciprocating rack member adapted to be reciprocated by said vertical rack member, gearing between said rack member and one of said slides, and change and reversing gearing between said rack member and the other slide.

14. In a tool slide mechanism, a vertically movable support, a pair of tool slides mounted to reciprocate thereon in vertical and transverse directions respectively, means adapted to impart an initial vertical movement to said support and tool slides as a unit, and a secondary reciprocating movement in different directions to said tool slides independently of the support.

15. In a tool slide mechanism, a vertically movable saddle, a plurality of tool slides mounted to reciprocate thereon, a rack carried by said saddle, gearing carried by said saddle meshing with said rack and adapted to reciprocate said tool slides, means adapted to reciprocate said rack, and means adapted to lock said rack to said saddle and to release it at a predetermined point, and whereby initial reciprocatory movement is imparted to said saddle and tool slides as a unit, and secondary movement in different directions is imparted to said tool slides independently of said saddle.

16. In a tool slide mechanism, a vertically movable saddle, a vertical tool slide and a horizontal tool slide mounted to reciprocate on said saddle, a rack carried by said saddle, gearing carried by said saddle meshing with said rack and adapted to reciprocate said tool slides simultaneously in vertical and horizontal directions respectively, means adapted to reciprocate said rack, and means adapted to lock said rack to said saddle and to release it at a predetermined point, and whereby initial reciprocatory movement is imparted to said saddle and tool slides as a unit, and secondary movement is imparted to said tool slides independently of the saddle.

17. In a tool slide mechanism, a vertically movable saddle, a vertically reciprocating tool slide and a horizontally reciprocating tool slide mounted thereon, means adapted to reciprocate said saddle a predetermined distance, means common to said tool slides adapted to be driven by said last means and whereby said tool slides are reciprocated independently of the saddle at the end of the predetermined movement of the saddle, and means for adjusting the predetermined point at which said saddle movement ceases and said independent tool slides movement starts.

18. In a machine of the character described, a stationary pedestal, a cam mounted thereon, a work carrier mounted to rotate about said pedestal, a vertically reciprocating saddle mounted on said column, a vertically reciprocating tool slide mounted on said saddle, means actuated through said cam through the rotation of said carrier adapted to reciprocate said saddle and tool slide as a unit for a predetermined initial period, and adapted to reciprocate said tool slide independently of said saddle at the end of said predetermined initial period.

Signed at Bridgeport, in the county of Fairfield and State of Connecticut, this 6th day of February, A. D. 1924.

EDWARD P. BULLARD, Jr.